United States Patent
Narrin

[19]

[11] Patent Number: 5,832,624
[45] Date of Patent: Nov. 10, 1998

[54] DEVICE FOR PROVIDING ELEVATED AND UNIVERSALLY ADJUSTABLE SUPPORT OF A HAIR DRYER

[76] Inventor: Nancy Narrin, 4450 Middle Channel Dr., Harsens Island, Mich. 48028

[21] Appl. No.: 828,261

[22] Filed: Mar. 21, 1997

Related U.S. Application Data

[63] Continuation-in-part of Ser. No. 594,647, Feb. 2, 1996, Pat. No. 5,613,305.

[51] Int. Cl.⁶ .................................................. A45D 24/10
[52] U.S. Cl. ................................................................ 34/97
[58] Field of Search .................................. 34/90, 91, 96, 34/97; 248/284.1, 288.31, 314, 315

[56] References Cited

U.S. PATENT DOCUMENTS

| | | |
|---|---|---|
| 260,912 | 7/1882 | Tibbals . |
| 499,933 | 6/1893 | Phillips . |
| 823,162 | 6/1906 | Detrick . |
| 1,074,648 | 10/1913 | Schwartzberg . |
| 2,058,102 | 10/1936 | Philipp . |
| 2,063,924 | 12/1936 | Hanko . |
| 2,560,556 | 7/1951 | Creedon . |
| 2,618,451 | 11/1952 | Campo . |
| 3,398,919 | 8/1968 | Tokar . |
| 4,461,439 | 7/1984 | Rose . |
| 4,635,382 | 1/1987 | Bourdeau . |
| 4,712,313 | 12/1987 | Gettleman . |
| 4,802,287 | 2/1989 | Chen . |
| 5,181,328 | 1/1993 | Bouverie . |
| 5,279,048 | 1/1994 | Lawall et al. . |
| 5,313,716 | 5/1994 | Wolfe . |
| 5,334,354 | 8/1994 | Johnston et al. . |
| 5,386,644 | 2/1995 | Lawall et al. . |
| 5,590,475 | 1/1997 | Andis ...................................... 34/90 X |
| 5,636,815 | 6/1997 | Wilson .................................... 34/90 X |
| 5,640,781 | 6/1997 | Carson ........................................ 34/97 |

*Primary Examiner*—Henry A. Bennett
*Assistant Examiner*—Steve Gravini
*Attorney, Agent, or Firm*—Gifford, Krass, Groh, Sprinkle, Patmore, Anderson & Citkowski, P.C.

[57] ABSTRACT

A device for providing elevated and universally adjustable support of a hair dryer, the hair dryer having a body with a handle portion and a heated air discharge portion. A receptacle member is provided for gripping the hair dryer by its handle portion and is positioned in the elevated and overhead fashion by an elongated support which is either supported by a floor base or is attached to a vertically extending wall. The receptacle member includes a plurality of curvilinear gripping portions which each define gripping surfaces for biasingly engaging the handle portion of the hair dryer. In one embodiment, a plurality of uniquely configured gripping portions extend from a base of the receptacle member and the hair dryer handle biasingly engages between a selected pair of the gripping portions. In a further preferred embodiment, the gripping portions are substantially circular shaped and extend in opposing fashion from a central portion to form a generally "S" shaped configuration in cross section. The circular shaped gripping portions are preferably sized differently to selectively accommodate any one of a greater range of differently sized hair dryer handles.

8 Claims, 4 Drawing Sheets

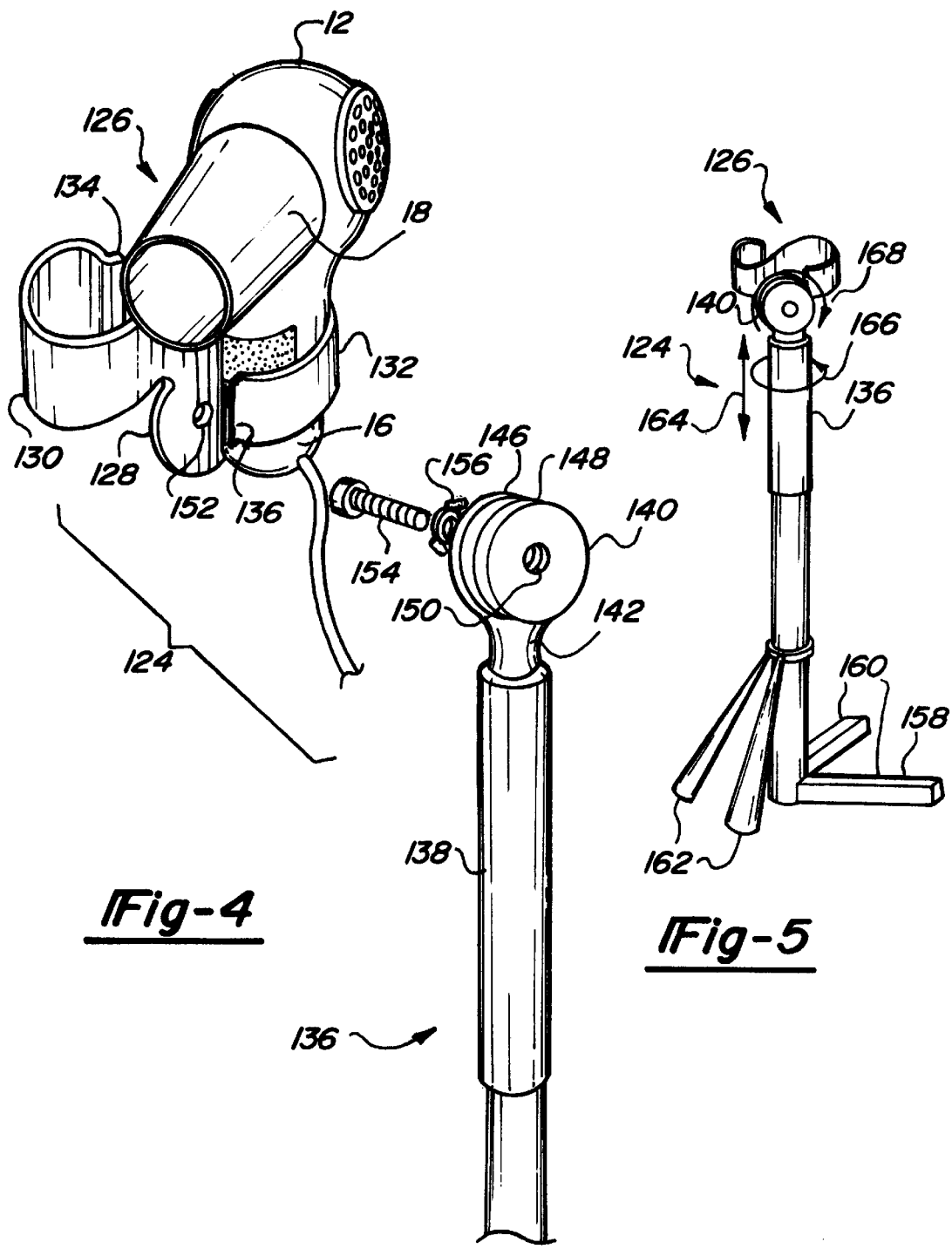

DEVICE FOR PROVIDING ELEVATED AND UNIVERSALLY ADJUSTABLE SUPPORT OF A HAIR DRYER

CROSS REFERENCE TO RELATED APPLICATIONS

The present application is a continuation in part of U.S. application Ser. No. 08/594,647, filed Feb. 2, 1996, now U.S. Pat. No. 5,613,305, for a Device for Providing Elevated and Universally Adjustable Support of a Hair Dryer.

BACKGROUND OF THE INVENTION

1. Field of the Invention

The present invention relates generally to hair dryers and hair dryer support devices and, more particularly, to an improved device for providing elevated and universally adjustable support of a conventional hand held hair dryer, thus freeing the user's hands.

2. Description of the Prior Art

Hair dryers and other various types of hair drying devices are well known in the art. The purpose of such devices is invariably the same, to quickly and conveniently dry a user's hair after washing in a manner and style which is desirable to the user.

The earliest known type of hair drying devices is the overhead variety which is customarily found in beauty parlors. The advantages of these dryers include that they can be mounted in an elevated and overhead fashion above the user and that they provide a fairly strong current of heated air directly to the user's head. Among the drawbacks of such devices are their relatively high expense and large size which makes for difficult portability.

In recent years, portable hand held hair dryers have come into existence which are for the most part capable of generating the heated currents of air to dry the user's hair in the same fashion as provided by the earlier beauty parlor models. Due to their portable nature however, the more recent devices require the use of at least one of the user's hands during drying. This tends to be a detriment to those who prefer to have both hands remain free during drying in order to make full use of whatever hair care accessories are available, e.g., combs, brushes, sprays and the like.

Applicant's prior invention, U.S. Ser. No. 08/594,647, filed Feb. 2, 1996, discloses a device for providing elevated and universally adjustable support of a hair dryer. According to a first embodiment, a receptacle member is constructed of first and second pincer jaw portions which grip a handle of the hair dryer therebetween. The interengaging surfaces of the jaw portions are formed with first and second semicircular receiving cavities which, when the jaws are engaged together, define first and second sized apertures gripping a hair dryer handle of any size. According to a further preferred embodiment, the receptacle member is a pedestal support having an appropriately configured interior cavity for receiving a universal ball which extends from a lower extremity of the dryer handle. According to a still yet further embodiment, the universal ball forms an upper part of the pedestal base and the lower extremity of the dryer handle is formed with the interior cavity for receiving therein the universal ball.

U.S. Pat. No. 4,712,313, issued to Gettleman, teaches a hands free portable hair dryer holder which is designed to hold a portable hair dryer while in use, allowing a person to use two free hands on the hair. The holder is attached to an end of a table or wall mounted and spring tensioned extendable arm by an adjustable portion. A barrel portion of the hair dryer within which the currents of air are heated and distributed is gripped by a pair of C-shaped jaws and the jaws are lined with foam inserts to securably affix the hair dryer.

It is readily apparent upon reviewing the Gettleman patent that its disclosure teaches a number of undesirable and potentially unsafe features. The most notable problem with Gettleman relates to the foam lined C-shaped jaws which grip therebetween the barrel portion of the hair dryer. As is well known, this part of the hair dryer will become extremely hot even after a short period of use. Due to the nature of its relatively simplified design, the extreme heat generated by a conventional hand held hair dryer is intended to be conducted to the atmosphere surrounding the barrel to prevent overheating of the device. Many of these devices also include automatic shut-off features to prevent overheating.

Having reviewed the Gettleman disclosure closely, it is evident that no accommodations have been made for dissipating the inevitable heat created within the barrel portion during use. As is well known, the heat resistant capabilities of foam materials are very poor and it is more than likely that, having been exposed by contact to the heated barrel for any duration of time, the foam would melt or possibly ignite into flames.

A further inherent shortcoming of the Gettleman holding device has to do with the spring tensioned arm which does not appear to include any fixing or locking means to anchor the dryer in a desired position. As is further well known, spring tensioned arms are very responsive to any type of applied force and will most likely fold inwardly in response to such a force application. As can be easily envisioned, the current of heated air discharged from a hair dryer as taught in Gettleman will create a rearwardly directed thrust which will most likely result in the dryer and holder being pushed backwards against the wall mount.

U.S. Pat. No. 4,461,439, issued to Rose, teaches a two-part holder for an appliance, such as a manually operable hair dryer, having first and second arcuate shaped members secured together by a bolt. The arcuate shaped members grip therebetween a handle portion of the hair dryer and include a base universal ball mount which is secured to a wall surface. An extensible linkage member is provided for laterally repositioning the arcuate members to accommodate handle portions of differing dimensions.

SUMMARY OF THE PRESENT INVENTION

The present invention is intended to be an improvement over the prior art and teaches a device for providing elevated and universally adjustable support of a hand held hair dryer. The hair dryer is of a conventional and portable type and includes a body with a handle portion and a heated air discharge portion. The device includes an elongated support which extends from a support surface and terminates in an elevated end portion. A receptacle member is secured to the elongated support end portion and releasably mounts the hair dryer by its handle portion so that the hair dryer is universally adjustable. According to a first preferred embodiment, the receptacle member is constructed of a plurality of curvilinear gripping portions which extend from a base of the receptacle member and which grip the hair dryer handle on opposing sides thereof. At least four such gripping portions are preferably employed, each of which is uniquely contoured and includes one or more reverse bend portions. The hair dryer handle is inserted between a selected pair of the gripping portions, causing the gripping portions to biasingly deflect in response so that the handle is releasably and securely seated between associated gripping surfaces of the gripping portions.

According to another preferred embodiment, the receptacle member includes a first substantially circular shaped and curvilinear gripping portion and a second likewise circular shaped and curvilinear gripping portion. The first and second gripping portions according to the further preferred embodiment extend in opposing fashion from a central portion which is in turn mounted to the elevated and elongated support.

Notwithstanding which of the above preferred embodiments of the receptacle member is employed, the elongated support can be either an upwardly extending and telescoping tubular support which is mounted upon a floor base or a wall mounted and extendable arm having first and second pivotally connected members. Regardless of whether the telescoping tubular members or the pivotally connected members of the elongated support are utilized, a loosening and retightening assembly is also provided to prevent inadvertent and unwanted movement of the elongated support resulting from the thrust generated by the hair dryer.

BRIEF DESCRIPTION OF THE DRAWINGS

Reference will now be made to the attached drawings, when read in combination with the following specification, wherein like reference numerals refer to like parts throughout the several views, and in which:

FIG. 4 is an exploded view in perspective of the elevated and universally adjustable hair dryer attachment secured to an elongated support shown in reduced section and according to a further preferred embodiment of the present invention;

FIG. 5 is a view of a floor mounted elongated support for mounting the hair dryer attachment according to the further preferred embodiment of FIG. 4;

DESCRIPTION OF THE PREFERRED EMBODIMENTS

Figure 1:
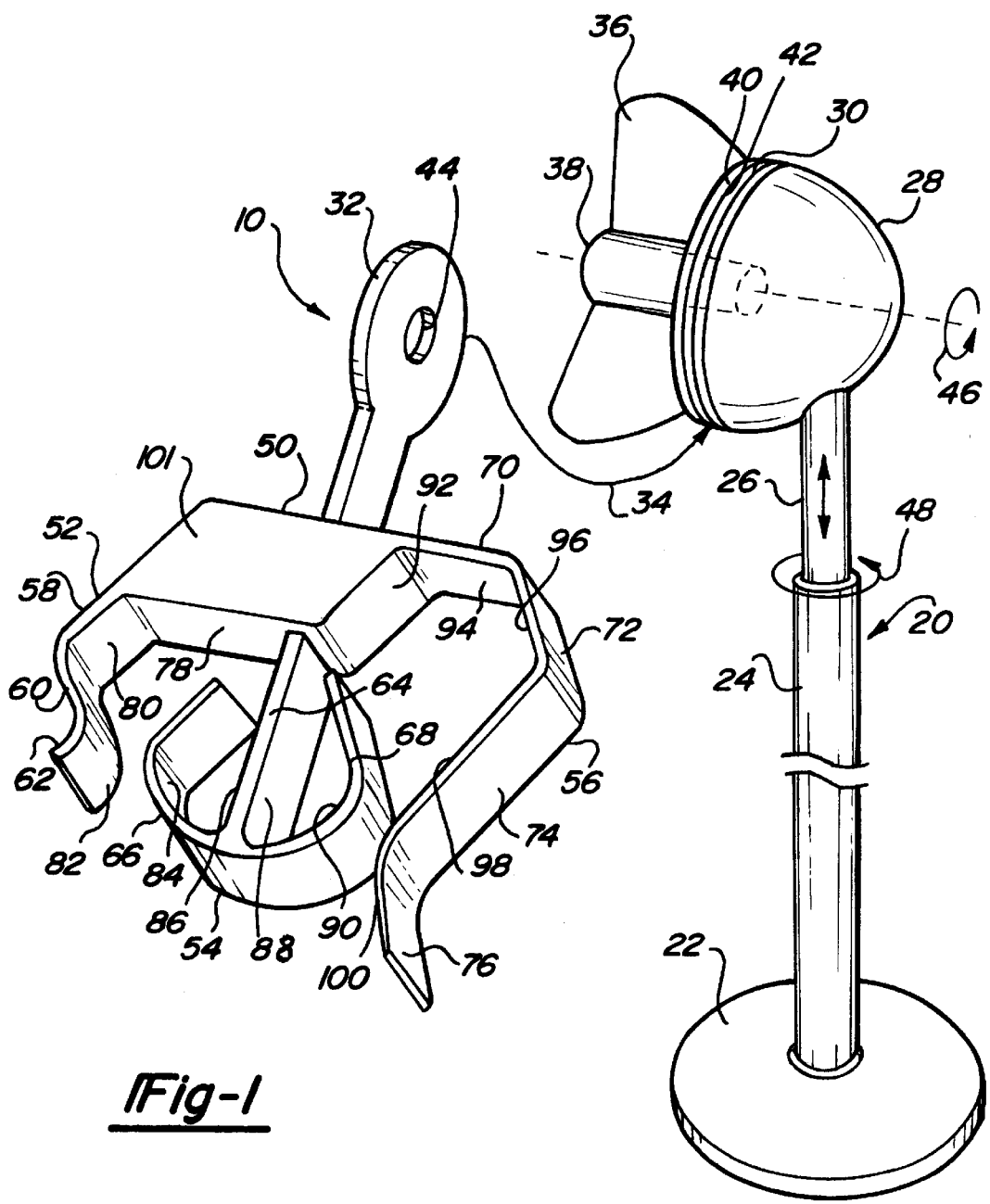
FIG. 1 is an exploded view in perspective of the elevated and universally adjustable hair dryer support in a floor mounted embodiment according to a first preferred embodiment of the present invention.

Referring to FIG. 1, a device 10 is shown for providing elevated and universally adjustable support of a conventional and portable hair dryer 12 (shown in FIG. 3) according to a first preferred embodiment of the present invention. The hair dryer 12 is typically of the hand held variety and includes a body 14 with a downwardly extending handle portion 16 and a forwardly directed heated air discharge portion 18.

Referring again to FIG. 1, an elongated support 20 is provided according to the first preferred embodiment and extends upwardly from a floor base 22 which supports the device 10 at an elevated position from a ground surface. The elongated support 20 may be formed as a single rigid piece but preferably includes first 24 and second 26 upwardly and telescoping members. The second member 26 is preferably slidably mounted within the first member 24, illustrated in reduced length for ease of presentation, and which has a hollow interior for receiving the second member 26. In a preferred embodiment, the first and second telescoping members 24 and 26 are frictionally engaged to an extent sufficient to permit them to be selectively and axially readjusted with the hair dryer secured in place. Alternative securing means, such as tightening screws and the like (not shown) may be provided to selectively adjust and readjust the overall height of the elongated support 20.

A loosening and retightening means is provided for selectively locking and unlocking the device 10 to an engaging portion 28 of the second telescoping member 26. The engaging portion 28 is preferably an elliptically shaped portion which is fixedly secured to an upper end of the telescoping member 26. An exterior planar face 30 of the engaging portion is provided and the mounting device 10 further includes a like shaped planar mounting portion 32 which is positioned in overlaying fashion relative to the planar face 30 of the engaging portion 28 in a fashion illustrated by directional arrow 34.

A wing nut assembly 36 is provided and includes a centrally extending and threaded bolt portion 38. The wing nut assembly 36 may further include an additional disc element 40 which has an oppositely facing planar surface 42 relative to the planar faced surface 30 of the elliptical shaped engaging portion 28. The planar face 30 of the elliptical engaging portion 28, the planar shaped mounting portion 32 of the mounting device 10 and the disc shaped element 40 all have centrally formed apertures, illustrated in part by aperture 44 shown in the engaging portion 32 and phantom view of the wing nut assembly 36, the apertures further being negatively threaded (not shown) and overlapping upon assembly of the mounting portion 32 between the planar faces 30 and 42.

Upon positioning the engaging portion 32 of the device 10 in a sandwiched fashion between the opposing portions 28 and 40, the wing nut assembly 36 is attached by rotating the exteriorly threaded bolt 38 within the aligned and negatively threaded apertures. In this fashion, the device 10 may be repositioned about a first rotational axis, indicated by arrow 46, and further about a second rotational axis, indicated by arrow 48, to provide substantially universally readjustable positioning of the attachment device 10.

Referring again to FIG. 1, the hair dryer attachment 10 according to the first preferred embodiment includes a body having a base 50 and a plurality of first 52, second 54 and third 56 uniquely configured curvilinear gripping portions which extend separately from the base 50 in a generally forward direction which is opposite to the direction of the engaging portion 32. Each of the curvilinear gripping portions 52, 54 and 56 are resiliently biased members which are constructed in elongate fashion, each having a generally flattened planar shape in cross section and including one or more reverse bend portions which define in combination pluralities of individual gripping surfaces.

Specifically, the first gripping portion 52 extends from a first generally edge location and includes a first curved portion 58, a second successive reverse bend portion 60 and a third successive reverse bend portion 62. The second gripping portion 54 is constructed slightly differently and includes a straight portion 64 which extends from a generally centralized location and terminates in a pair of first 66 and second 68 inwardly curved portions. Finally, the third gripping portion 56 extends from a second generally edged location and includes a first laterally extending portion 70, a second outwardly curved portion 72, a third reverse bend portion 74 and a fourth successive reverse bend portion 76.

The arrangement of the curvilinear gripping portions 52, 54 and 56 is such that a plurality of opposingly facing gripping surfaces is provided. Specifically, the first gripping portion 52 includes gripping surfaces 78, 80 and 82, the second gripping portion 54 includes gripping surfaces 84, 86, 88 and 90 and the third gripping portion 56 includes gripping surfaces 92, 94, 96, 98 and 100. An identifying design indicia 101 of some sort may also be provided on a surface of the base 50.

Figure 2:
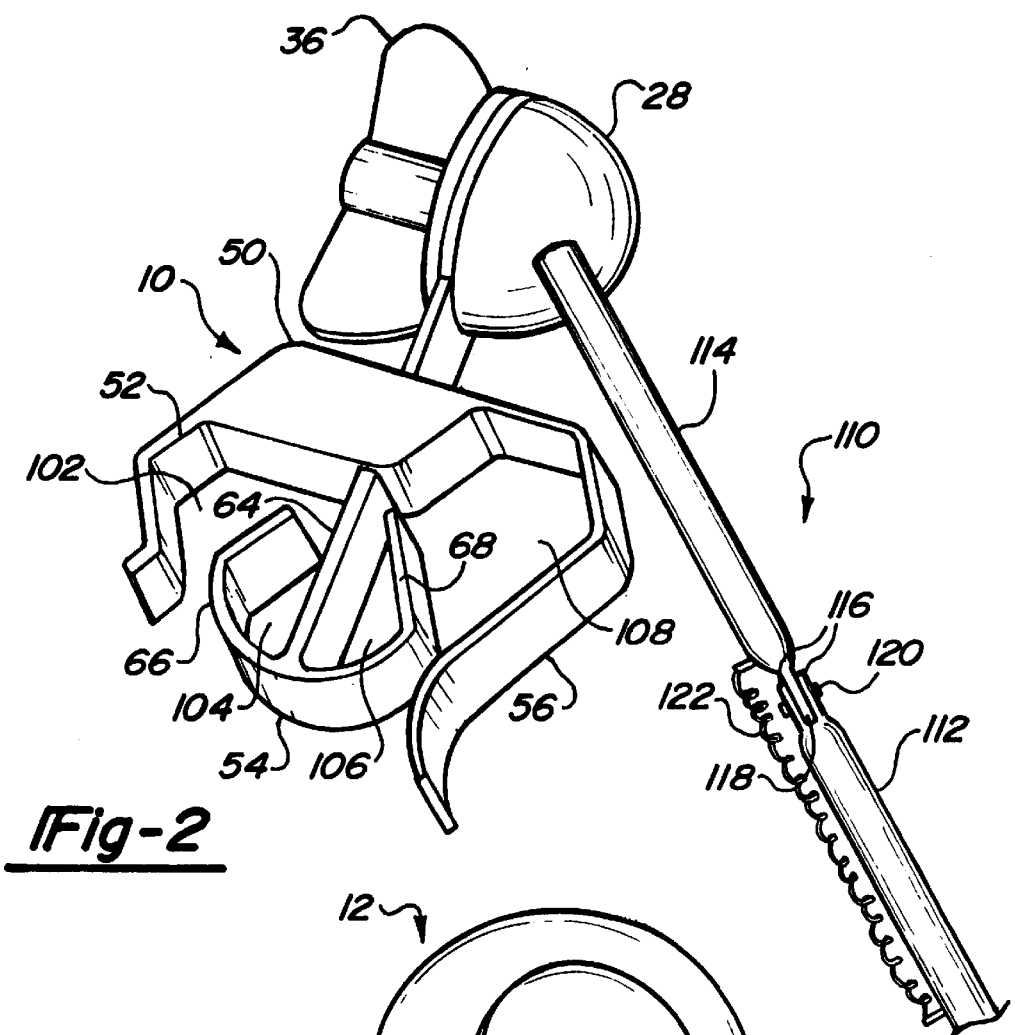
FIG. 2 is a view of the hair dryer support similar to that shown in FIG. 1 and illustrating the receptacle member secured to a wall mounted and elongated support with a loosening and retightening wing nut assembly according to the present invention FIG. 3 a view in perspective of a conventional hair dryer capable of being secured within the hair dryer support according to the present invention.

Referring to FIG. 2, the configuration of the curvilinear gripping portions 52, 54 and 56 is such that a plurality of individual and biasingly deflectable engaging cavities are formed between selective pairs of the gripping portions for biasingly engaging the hair dryer handle. A first engaging cavity 102 is created between the first gripping portion 52 and curved portion 66 of the second gripping portion 54. A second engaging cavity 104 is created between the curved portion 66 and straight extending portion 64 of the second gripping portion 54. A third engaging cavity 106 is created between the curved portion 68 and the straight extending portion 64 of the second gripping portion 54. Finally, a fourth engaging cavity 108 is created between the curved portion 68 of the second gripping portion 54 and the third gripping portion 56.

Figure 3:
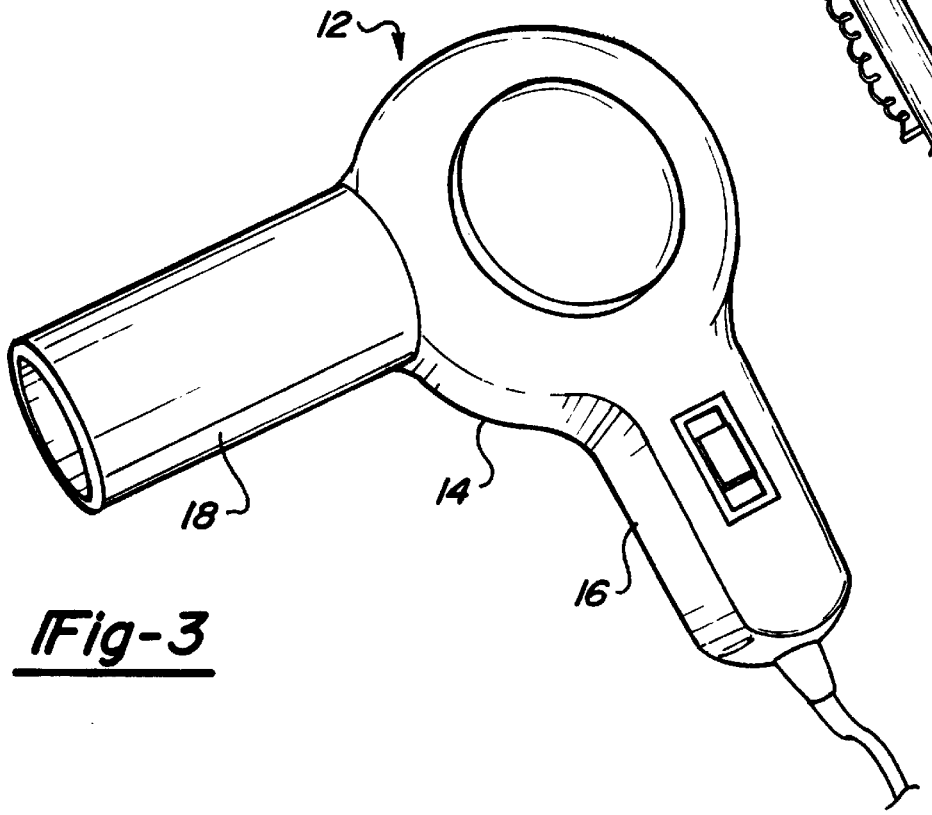

As is illustrated in FIG. 3, the conventional hair dryer 12 is inserted by its handle portion 16 into a selected one of the receiving cavities 102, 104, 106 or 108 and the cavities are sized differently to accommodate a wide variety of differently sized hair dryer handles. The resilient biasing properties of the gripping portions as well as their substantially planar shaping permits the specified receiving cavity 102, 104, 106 or 108 to grip the hair dryer handle in a fixed and releasably securable manner.

Referring again to FIG. 2, an alternative variant of an elongated support 110 is illustrated and includes a first elongated portion 112 and a second elongated portion 114 which is pivotally connected to an end of the first portion 112. Specifically, the first elongated portion 112 includes a pair of axially extending and parallel spaced hinge portions 116 and the second elongated portion 114 includes a single axially extending hinge portion 118 which seats between the spaced apart pair of hinge portions 116. While not clearly illustrated in the view of FIG. 2, the hinge portions 116 and 118 have interiorly formed apertures which align to permit the insertion of a pin 120 to enable the second portion 114 to pivot relative to the first portion 112.

In a preferred variant, the first portion 112 is secured to a wall surface and the first and second portions 112 and 114 extend in a substantially horizontal direction. As is also envisioned, the first and second elongated portions 112 and 114 may be spring biased by a coil or like member 122 and the pin 120 may be releasably tightened to permit the first and second portions to pivot about a horizontal axis relative to one another. Otherwise, the attachment device 10 secures to the elliptical shaped engaging portion 28 by the wing nut assembly 36 and the engaging portion 28 is likewise fixedly secured to the end of the second elongated portion 114 as with the variant of FIG. 1.

Referring now to FIG. 4, an exploded view is shown at 124 of a device according to a further preferred embodiment for mounting the hair dryer 12 atop an elongated support. A receptacle member 126 is provided according to the further preferred embodiment and includes a central mounting portion 128, a first substantially circular shaped and curvilinear gripping portion 130 extending from one side of the central mounting portion 128 and a second substantially circular shaped and a second curvilinear gripping portion 132 extending from the other side of the mounting portion 128.

The receptacle member 126 is preferably constructed of the same type of material as the receptacle member 10 and the curvilinear gripping portions 130 and 132 are preferably planar shaped in cross section and, in combination, define a substantially "S" shape when viewed from above. The conventional hair dryer 12 is mounted by its handle portion 16 within a selected one of the curvilinear gripping portions, illustrated as second gripping portion 132 in FIG. 4, and the first and second gripping portions 130 and 132 each include an outwardly flared lip portion, 134 and 136, respectively. The lip portions 134 and 136 facilitate outwardly resiliently biasing of the associated gripping portions 130 and 132 to permit insertion of the hair dryer handle and subsequent and responsive inwardly resilient bias to mount the hair dryer in place against associated gripping surfaces formed on the inwardly facing and opposing contours of the gripping portions in a releasably securable fashion. According to a preferred embodiment, the first and second curvilinear gripping portions 130 and 132 are each differently dimensioned, perhaps with the first portion 130 being of a smaller overall diameter than the second portion 132, in order to accommodate differently sized hair dryer handles and so that the device of the present invention may be utilized with a wide variety of differently configured hair dryers.

Still referring to FIG. 4, an elongated support 136 according to a first desired variant is illustrated for supporting the receptacle member 126 at an elevated position and includes a first outer tubular member 138 which extends generally upwardly and is internally hollowed for receiving an axially adjustable mounting portion 140. The mounting portion 140 further includes a second elongated and inner tubular member 142 for slidably engaging within the first outer tubular member 138 and a pair of substantially disk shaped and parallel spaced portions 146 and 148 which define therebetween a channel of sufficient dimension for receiving the central mounting portion 128 of the receptacle member 126. The disk shaped and parallel spaced portions 146 and 148 each include a centrally formed aperture, illustrated at 150, and the like configured mounting portion 128 includes a similar aperture 152.

Referring again to FIG. 4, and also to FIG. 5, the mounting portion 128 of the receptacle member 126 is positioned within the space established between the disk shaped portions 146 and 148 and a mounting bolt 154 is provided for inserting through the aligned apertures and being engaged by a rotatable wing nut 156. Referring exclusively to FIG. 5, the embodiment of FIG. 4 is illustrated in overall perspective and shows a pedestal support 158 of the elongated support 136 which includes a first plurality of horizontally extending platform supports 160 and a second plurality of angled support portions 162.

The embodiment of FIGS. 4 and 5 is therefore constructed so that the receptacle member 126 is axially adjustable in a first direction indicated by arrow 164, a second rotational direction between the telescoping members 138 and 142 indicated by arrow 166 and a third rotational direction of the receptacle member 126 relative to the adjustable mounting portion 140, illustrated by arrow 168. The device of the present invention is therefore capable of substantially universal and repositionable adjusting support of the hair dryer held within the receptacle member.

Figure 6:
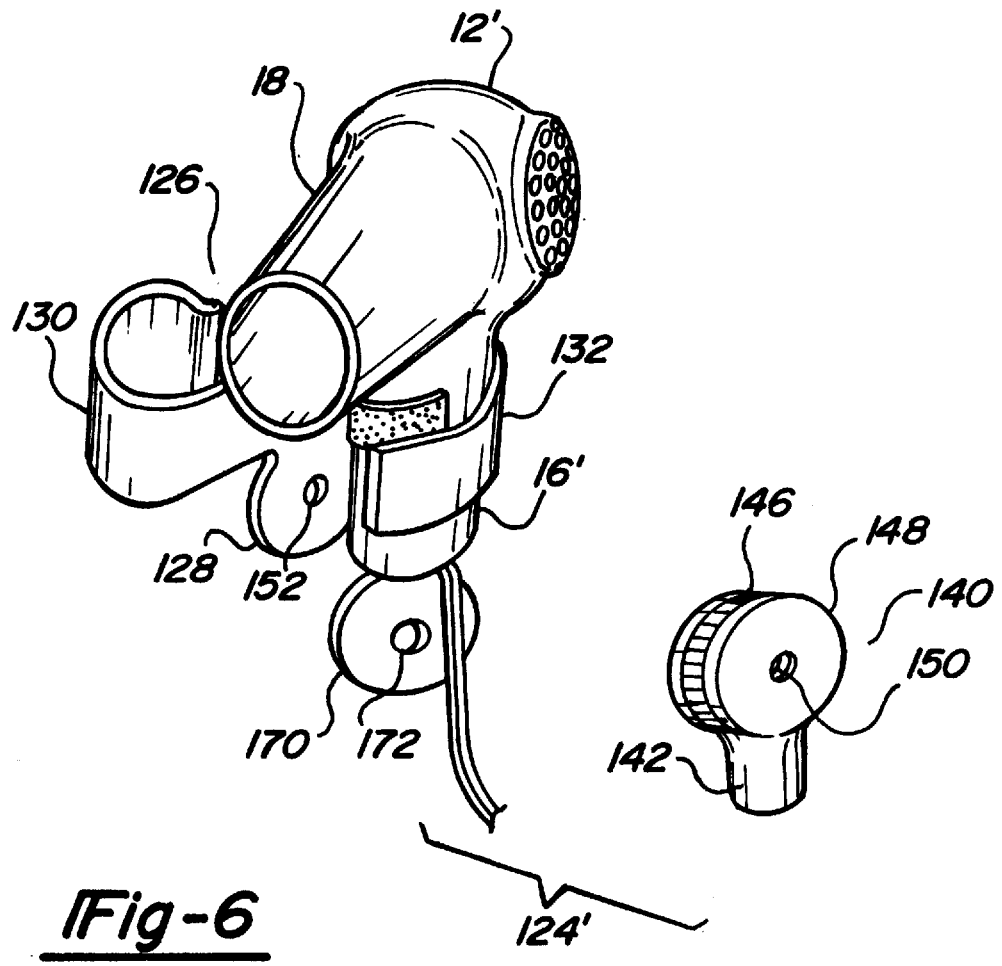
FIG. 6 is a partially exploded view of a modified hair dryer for use with the hair dryer support attachment according to the present invention.

Referring to FIG. 6, a substantially identical view of the attachment device and elongated support 124' is shown in comparison to that described with reference to FIGS. 4 and 5. The embodiment of FIG. 6 differs only in that a hair dryer 12' according to a further preferred variant may include a downwardly extending mounting portion 170 which is substantially disk shaped and includes a central aperture 172 for positioning between the spaced portions 146 and 148 of the mounting portion 140 and rotatably securing in place with the bolt and wing nut assembly previously described. The optional mounting portion 170 may either be integrally formed with the handle 16' of the hair dryer or may be releasably securable by fasteners, adhesives or the like.

Figure 7:
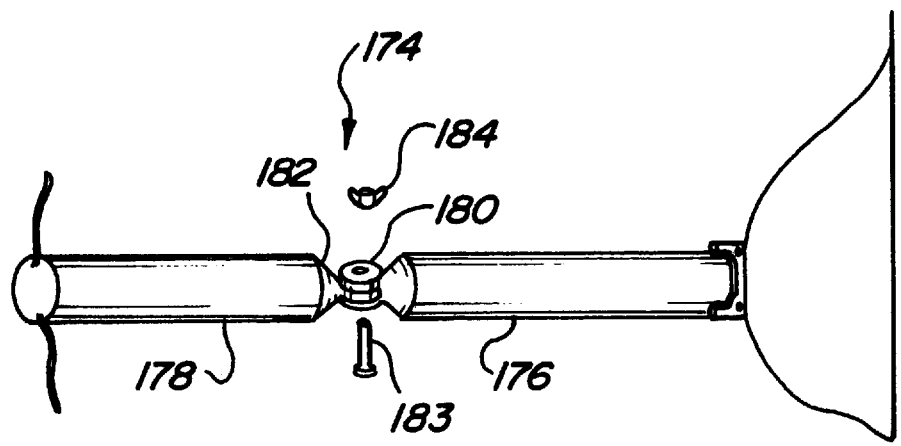
FIG. 7 is a view of an alternately configured elongated support in partially reduced section to which is mounted the hair dryer support attachment according to the present invention.

Referring finally to FIG. 7, a wall mounted variant of an elongated support 174 is illustrated for use with the further preferred embodiment 124 and 124' of the present invention and includes a first elongated portion 176 and a second elongated portion 178 which is pivotally secured to the first elongated portion. As was described with reference to FIG. 2, the first mounting portion 176 includes a pair of spaced apart and axially extending mounting portions 180 and the second mounting portion 178 likewise includes a single axially extending mounting portion 182 which slidingly inserts between the mounting portions 180. Again, apertures are formed in the overlapping portions 180 and 182 and a pin or like fastener 183 with an engaging shaft portion is inserted through the overlapping apertures for receiving a wing nut 184 or the like. A remote end of the second elongated portion 178 is shown in reduced length, however it is evident that the mounting portion 140 illustrated partially in FIG. 6 may be integrally secured to the elongated portion 178 in a horizontally extending fashion. The first and second members 176 and 178 of the elongated support 174 may further be adjustable both horizontally and vertically and may further make use of biasing means such as coil springs or the like, not shown, for facilitating ease of fixed and repositionable readjustment of the receptacle member 126 and secured hair dryer.

Accordingly, the present invention discloses a useful and improved device for providing elevated and universally adjustable support by safely gripping a handle portion of a hair dryer. The device of the present invention may also advantageously be used in a hotel room bathroom in either the wall mount or floor base mount arrangements and such an application is anticipated.

Having described my invention, additional embodiments will become apparent to one skilled in the art to which it pertains without deviating from the scope of the appended claims.

I claim:

1. A device for providing elevated and universally adjustable support of a held hair dryer, the hair dryer having a body with a handle portion and a heated air discharge portion, said device comprising:

an elongated support extending from a support surface and terminating in an elevated end portion;

a receptacle member secured to said elongated support end portion, said receptacle member including a first curvilinear gripping portion, a second curvilinear gripping portion and a third curvilinear gripping portion, said gripping portions each being substantially planar shaped in cross section and being constructed of a resiliently biasing material so as to define in combination a plurality of individual hair dryer handle receiving cavities, each of said cavities being differently dimensioned and capable of separately and releasably engaging the handle portion of the hair dryer;

said receptacle member further comprising a body with a base portion, a mounting portion extending in a first direction from said base portion for pivotally securing said body to said elongated support end portion, and said first, second and third gripping portions extending in a generally opposite direction from said mounting portion; and means for mounting the hair dryer by its handle portion to said at least one gripping portion so that the hair dyer is universally adjustable.

2. The device according to claim 1, said elongated support further comprising a first elongated portion and a second elongated portion secured to said first elongated portion and terminating in a mounting portion.

3. The device according to claim 2, said elongated support further comprising means for fixedly repositioning said receptacle member and attached hair dryer from a first position to a second position.

4. The device according to claim 3, further comprising said first elongated portion and said second elongated portion being telescopingly engaged, said mounting portion including means for pivotally engaging an associated mounting portion of said receptacle member, said telescoping members capable of being readjusted in an axial fashion and said receptacle member further being capable of rotational readjustment relative to said elongated support.

5. The device according to claim 3, further comprising said first elongated portion and said second elongated portion being pivotally engaged in end to end fashion, said mounting portion including a planar shaped engaging portion upon which is received an associated mounting portion of said receptacle member, said angularly adjustable members capable of being readjusted in an axial fashion and said receptacle member further being capable of rotational readjustment relative to said elongated support.

6. The device according to claim 4, said upwardly extending telescoping assembly with first and second telescoping members being supported upon a ground surface by a floor base, repositioning means comprising a wing nut and bolt assembly which inserts through apertures formed in said mounting portions and releasably secures said receptacle member to said elongated support.

7. The device according to claim 5, said pivotally connected members being secured to a wall surface, repositioning means comprising a wing nut and bolt assembly which inserts through apertures formed in said mounting portions and releasably secures said receptacle member to said elongated support.

8. A device for providing elevated and universally adjustable support of a held hair dryer, the hair dryer having a body with a handle portion and a heated air discharge portion, said device comprising:

an elongated support extending from a support surface and terminating in an elevated end portion;

a receptacle member secured to said elongated support end portion, said receptacle member including a body with a central mounting portion, a first substantially circular shaped and curvilinear gripping portion extending from one side of said central mounting portion and a second substantially circular shaped and curvilinear gripping portion extending from an opposing side of said central mounting portion, said first and second gripping portions each being substantially planar shaped in cross section and being constructed of a resiliently biasing material, said first gripping portion being sized according to a first dimension and said second gripping portion being sized according to a second dimension, said first gripping portion having a first outwardly flared lip and said second gripping portion having a second outwardly flared lip, said outwardly flared lips permitting said associated curvilinear gripping portions to outwardly and biasingly deflect in response to insertion of the hair dryer handle and to responsively and inwardly bias said handle within said receptacle member after insertion within a selected one of said first gripping portion and second gripping portion; and means for mounting the hair dryer by its handle portion to said at least one gripping portion so that the hair dryer is universally adjustable.

* * * * *